F. STREICH.
BUCKET FOR PROOFING APPARATUS.
APPLICATION FILED DEC. 13, 1919.
1,382,610.
Patented June 21, 1921.
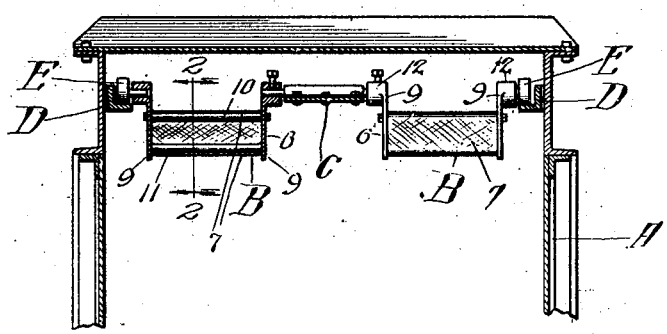
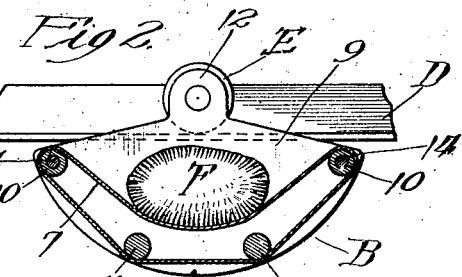
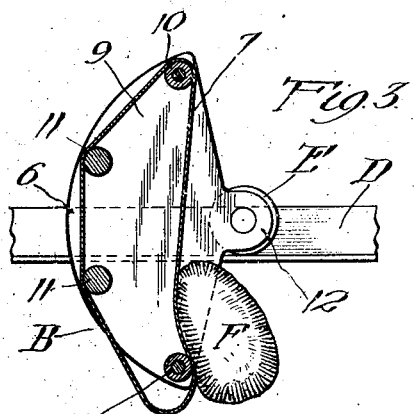
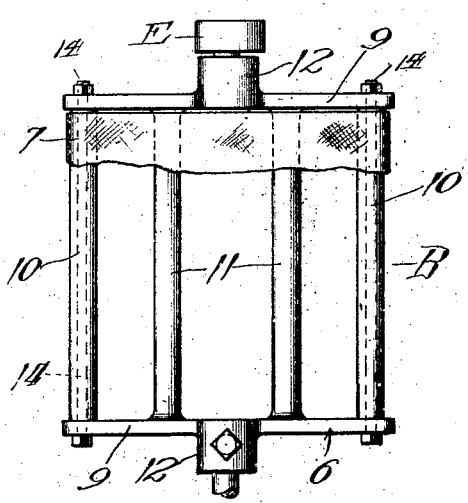
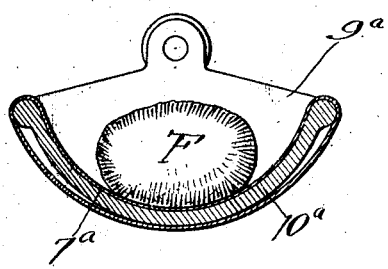
Inventor.
Frank Streich,
by Charles O. Shurey,
his Atty.

UNITED STATES PATENT OFFICE.

FRANK STREICH, OF JOLIET, ILLINOIS, ASSIGNOR TO UNION MACHINERY COMPANY, OF JOLIET, ILLINOIS, A CORPORATION OF ILLINOIS.

BUCKET FOR PROOFING APPARATUS.

1,382,610.  Specification of Letters Patent.  Patented June 21, 1921.

Application filed December 13, 1919. Serial No. 344,594.

*To all whom it may cencern:*

Be it known that I, FRANK STREICH, a citizen of the United States, and a resident of Joliet, Will county, and State of Illinois, have invented certain new and useful Improvements in Buckets for Proofing Apparatus, of which the following is declared to be a full, clear, and exact description.

This invention relates to buckets for proofing apparatus, and its principal object is to provide simple and efficient means for preventing the lumps of dough from adhering to the bottoms of the buckets when the latter are tilted or inverted to discharge the lumps of dough therefrom. Much difficulty is experienced in keeping the dough from adhering to the bottoms of buckets of proofing apparatus, and many attempts have been made to overcome this difficulty. It arises principally in case the dough is sticky or not properly floured, or because the bottoms of the buckets are not floured. My present invention overcomes this defect in proofing apparatus and makes certain the discharge of the lumps of dough whenever the bucket is tilted into discharging position, thereby preventing the lumps of dough from being again carried around in the proofing chamber after passing the discharge end thereof. Another object is to provide a bucket for proofing apparatus, which may be easily kept in a clean and sanitary condition. With these and other objects and advantages in view this invention consists in a bucket for proofing apparatus having a flexible or pliable bottom capable of sagging away from its place of support when the bucket is tilted. The invention further consists in a bucket for proofing apparatus in which the bottom is constructed of woven fabric, such as canvas or other strong cloth and capable of sagging away from its place of support when the bucket is tilted. The invention further consists in the several novel features hereinafter fully set forth and claimed.

The invention is clearly illustrated in the accompanying drawing, in which:

Figure 1 is a vertical cross section taken through a proofing apparatus and showing therein a pair of buckets embodying a simple form of the present invention; Fig. 2 is a vertical section through one of the buckets taken on the line 2—2 of Fig. 1 and showing the same in carrying position; Fig. 3 is a view similar to Fig. 2 except that the bucket is shown in a tilted position, discharging its contents; Fig. 4 is a plan of one of the buckets with the bottom partly broken away and Fig. 5 is a vertical section of a bucket showing a slightly modified form of the invention.

Referring to said drawing, the reference character A designates the proofing chamber of a proofing apparatus of simple construction in which the buckets B are contained and if desired said buckets may be arranged in pairs and connected to an endless conveyer or belt C, which is arranged to travel back and forth in the proofing chamber carrying the buckets from a receiving end to a discharge end where the buckets are tilted or inverted to discharge the lumps of dough therefrom. As a preference tracks D are provided in the proofing chamber for supporting the buckets, which may be provided with rollers E traveling upon said tracks.

The bucket, forming the subject matter of this invention, is preferably constructed of a frame 6 and a flexible or pliable bottom member 7, preferably constructed of canvas, strong cloth or the like. The frame 6 conveniently may comprise sides 9 connected together as for instance by transversely extending members 10, 11. The upper ends of the sides may be formed with ears 12 to which the rollers E and belt connections for the endless belt C may be secured.

The transverse members 10 are provided at the upper ends of the bucket and the flexible bottom 7 may be secured to and extend between said end transverse members 10, but I prefer to make the bottom in the form of an endless band trained around said transverse members 10 and, if desired, around the transverse members 11, the upper portion of the endless band serving to receive and support lumps of dough, shown at F. The flexible bottom is thereby loosely supported by the frame and sags down from its places of suspension, whereby it is free to sag from its places of suspension when the frame is tilted to discharge the lump of dough carried by the bucket. If desired the transverse members 10 may be in the form of rollers journaled upon bolts or rods 14 secured in the side members 9. The sides and transverse members may, however, be cast in one piece if it is so desired.

In the modified form illustrated in Fig. 5, the side members 9ª are shown as connected by a solid transverse member 10ª, which forms a sort of false bottom for the bucket. The flexible bottom 7ª is shown in the form of an endless band extending around said false bottom.

In the operation of the device the conveyer is set in motion and travels back and forth in the proofing chamber carrying the buckets along with it from the receiving end to the discharge end, where the buckets engage with suitable dumping mechanism and are tilted sufficiently to discharge the lumps of dough therefrom. While traveling through the proofing chamber, the lump of dough rests upon the flexible bottom 7 of the bucket, and when the latter engages the dumping mechanism it is tilted and swung into a position substantially like that seen in Fig. 3. The lump of dough thereupon falls out of the bucket and if for any reason it adheres to the flexible bottom, the latter is pulled along with the lump of dough, and is advanced around the transverse members, and as the dough finally tumbles out of the bucket it jerks the flexible bottom and becomes loosened therefrom. The bottom is thereby shifted, bringing another portion of it into position to act as the bottom of the bucket.

In Fig. 3 the lump of dough is shown at a position just prior to being finally discharged from the bucket, but as adhered to the flexible bottom. Obviously, when the lump of dough drops beyond this position, it will jerk loose from the flexible band when its point of adherence to the band reaches the lower limit of movement thereof. After the bucket passes the dumping mechanism it automatically drops back to a carrying position and when a subsequent lump of dough is delivered to the bucket the endless band or flexible bottom 7 assumes its normal carrying position.

One of the principal advantages of this device arises from the fact that the flexible bottoms may be readily slipped over the outer sides 9 of the buckets and removed therefrom for the purpose of being washed. In this way the flexible bottoms may be kept in a clean and sanitary condition at all times.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. A dough carrying bucket for proofing apparatus, comprising a tiltable frame and a flexible bottom loosely supported thereby.

2. A dough carrying bucket for proofing apparatus, comprising sides, transversely extending connecting members therebetween and a flexible bottom extending over said transverse members and loosely supported thereby.

3. A dough carrying bucket for proofing apparatus, comprising side members and transversely extending connecting members therebetween and an endless flexible band extending over said transverse extending members and forming a bottom for the bucket.

4. A dough carrying bucket for proofing apparatus, comprising side members, rollers extending therebetween at the ends thereof and an endless flexible band trained around said rollers and forming the bottom of the bucket.

5. A dough carrying bucket for proofing apparatus, comprising a tiltable frame and an endless flexible bottom carried thereby.

6. A dough carrying bucket for proofing apparatus, comprising a tiltable frame, and a flexible bottom therefor formed of canvas and loosely supported thereby.

7. A dough carrying bucket for proofing apparatus, comprising a tiltable support and a flexible bottom supported thereby solely along its top.

8. A dough carrying bucket for proofing apparatus, comprising a tiltable frame formed of connected side members and a flexible bottom connected solely at its top to the frame.

9. A dough carrying bucket for proofing apparatus, comprising a tiltable frame formed of side members and connecting rollers and an endless flexible bottom trained around said rollers.

10. A dough carrying bucket for proofing apparatus comprising a tiltable frame formed of side members and connecting rollers and an endless bottom formed of canvas trained around said rollers.

FRANK STREICH.